US008002939B2

(12) United States Patent
Tremel et al.

(10) Patent No.: US 8,002,939 B2
(45) Date of Patent: Aug. 23, 2011

(54) ENCAPSULATION TOOL AND METHODS

(75) Inventors: James Daniel Tremel, Santa Barbara, CA (US); Matthew Dewey Hubert, Goleta, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 758 days.

(21) Appl. No.: 11/721,732

(22) PCT Filed: Dec. 29, 2005

(86) PCT No.: PCT/US2005/047412

§ 371 (c)(1), (2), (4) Date: Jan. 28, 2008

(87) PCT Pub. No.: WO2006/074062

PCT Pub. Date: Jul. 13, 2006

(65) Prior Publication Data

US 2008/0257473 A1 Oct. 23, 2008

Related U.S. Application Data

(60) Provisional application No. 60/640,781, filed on Dec. 30, 2004.

(51) Int. Cl.
*B29C 65/14* (2006.01)

(52) U.S. Cl. ...................... 156/285; 156/382; 425/405.1

(58) Field of Classification Search .................. 156/285, 156/382; 425/405.1
See application file for complete search history.

(56) References Cited

U.S. PATENT DOCUMENTS 3,489,608 A * 1/1970 Jacobs et al. ................ 134/25.4
4,421,589 A 12/1983 Armini et al. ................ 156/382
4,573,627 A * 3/1986 Miller et al. ................ 228/102
4,718,974 A * 1/1988 Minaee ........................ 438/708
4,899,921 A * 2/1990 Bendat et al. ................ 228/105
5,094,709 A 3/1992 Eichelberger et al. ..... 156/380.9
5,191,218 A * 3/1993 Mori et al. .............. 250/453.11
5,352,327 A * 10/1994 Witowski ...................... 134/1.3
6,209,480 B1 * 4/2001 Moslehi ..................... 118/723 I
6,303,238 B1 10/2001 Thompson et al. .......... 428/690
6,304,311 B1 * 10/2001 Egami et al. ................. 349/189
6,495,233 B1 * 12/2002 Shmurun et al. ............ 428/64.1
6,585,837 B1 7/2003 Keil et al. ...................... 156/64
2001/0019782 A1 9/2001 Igarashi et al. .............. 428/690
2003/0145944 A1 8/2003 Lee et al. ...................... 156/282
2005/0120956 A1 * 6/2005 Suzuki ......................... 118/719

FOREIGN PATENT DOCUMENTS

EP 1 191 612 A2 3/2002
EP 1 191 614 A2 3/2002
WO WO 00/70655 11/2000
WO WO 01/41512 A1 6/2001
WO WO 02/02714 A2 1/2002
WO WO 02/15645 A1 2/2002

OTHER PUBLICATIONS

Campbell, I.H. et al., "Excitation Transfer Processes in a Phosphor-Doped Poly (*p*-phenylene vinylene) Light-Emitting Diode", *Physical Review B*., vol. 65, 085210-1-085210-8 , Feb. 8, 2002. Gustafsson, G. et al., "Flexible Light-Emitting Diodes made from Soluble Conducting Polymer", *Nature*, 1992, 357, 477-479.
O'Brien, D.F. et al., "Electrophosphoresence from a Doped Polymer Light Emitting Diode", *Synthetic Metals*, 2001, 116(1-3), 379-383.
Othmer, K., *Encyclopedia of Chemical Technology*, 1996, 18 ($4^{th}$ Ed), 837-860.

* cited by examiner

*Primary Examiner* — Robert B Davis
(74) *Attorney, Agent, or Firm* — Woodcock Washburn LLP

(57) ABSTRACT

Methods and devices are provided for improving the encapsulation processes for an organic electronic device.

9 Claims, 2 Drawing Sheets

ENCAPSULATION TOOL AND METHODS

CROSS-REFERENCE TO RELATED APPLICATIONS

This application is the National Stage of International Application No. PCT/US2005/047412, filed Dec. 29, 2005, which claims the benefit of U.S. Provisional Application No. 60/640,781, filed Dec. 30, 2004, the disclosure of which is incorporated herein by reference in its entirety.

FIELD

This disclosure relates generally to fabricating organic electronic devices.

BACKGROUND

Organic electronic devices convert electrical energy into radiation, detect signals through electronic processes, convert radiation into electrical energy, or include one or more organic semiconductor layers. As can be appreciated, it is important to seal an organic electronic device from environmental factors, such as oxygen and moisture. Thus, the organic electronic device is often encapsulated with a film, or plurality of films, in order to form a barrier.

Current encapsulation processes produce devices with highly variable performance parameters and low process yields. Successful encapsulation of devices requires accurate placement of the sealant materials (epoxies, etc.) in a controlled environment. Variations in temperature, pressure, and other ambient conditions affect the dispensing characteristics of sealant materials and the ability to accurately deposit them, as well as the ability to do so in a repeatable manner. One of the biggest challenges of successfully encapsulating a device is the ability to control the pressure inside the device after encapsulation and before the sealant is cured. If this pressure is too high, the gas inside the device can find a weakly bonded portion of the uncured seal and force it open and form a defect in the seal. The result will be a failed device.

Thus, improved processes for encapsulation are needed.

SUMMARY

Devices are provided comprising a housing, a lid for engaging the housing, such that when engaged, the lid and housing define a sealed space therebetween, and a controller for modifying conditions in the sealed space.

Methods for encapsulating an organic electronic device are provided, comprising controlling the internal pressure of the organic electronic device after encapsulation.

Methods for aligning an encapsulation lid of an organic electronic device are provided, comprising placing the organic electronic device in a device as described above.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

The figures are provided by way of example and are not intended to limit the invention. Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

In one embodiment, a device for encapsulating an organic electronic device (FIG. 1) is provided.

In one embodiment, a device comprising a housing, a lid for engaging the housing, such that when engaged, the lid and housing define a sealed space therebetween, and a controller for modifying conditions in the sealed space is provided.

In one embodiment, the sealed space is adapted for receiving an organic electronic device, such as will be described with respect to FIG. 1.

In one embodiment, the controller controls pressure in the sealed space. In one embodiment, the controller controls temperature in the sealed space. In one embodiment, the controller controls the gas identity in the sealed space. In one embodiment, the controller controls pressure, temperature, and gas identity.

In one embodiment, the device further comprises at least one alignment camera.

In one embodiment, the device further comprises at least one UV light source.

Figure 2:
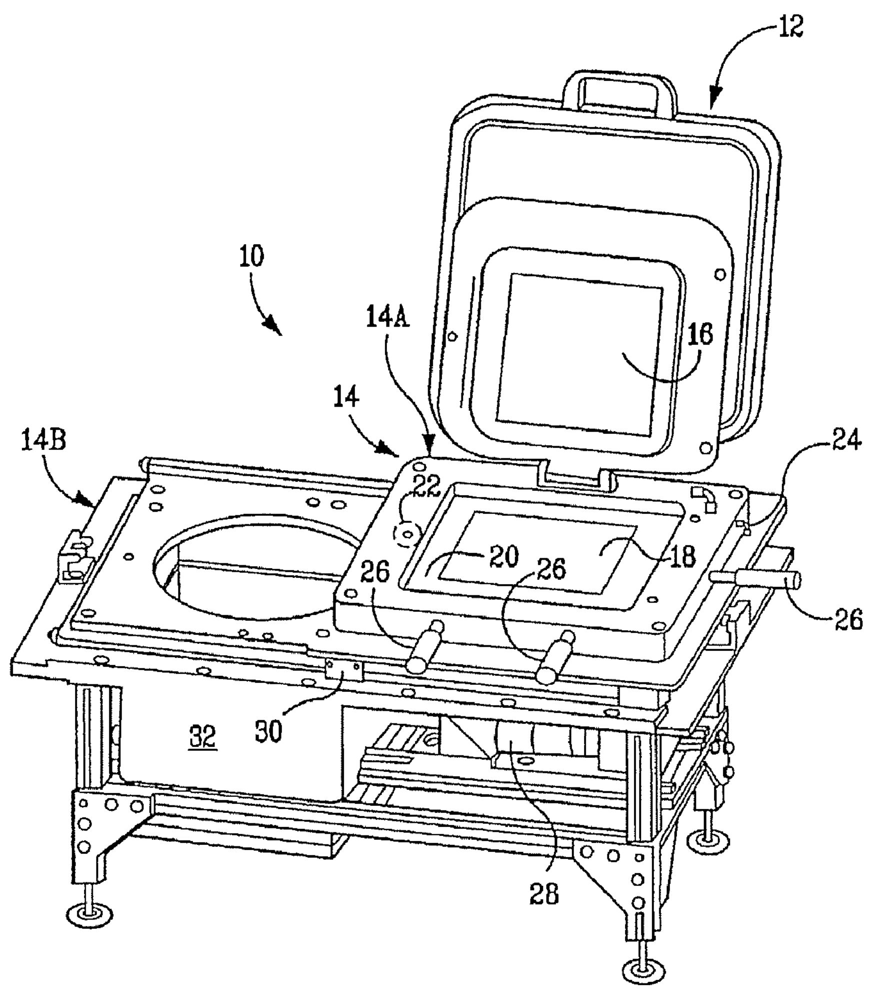
FIG. 2 is a perspective view of a device for encapsulating an organic electronic device.

An illustrative encapsulation device is shown in FIG. 2, and is designed to provide accurate control of the temperature, pressure, and gas environment during encapsulation. In addition to precisely tuning temperature, pressure, and gas environment, the tool provides alignment cameras for accurate placement of the encapsulation lid, and a UV curing station to finish the sealing process. As a result of providing a controlled environment, the use of this tool greatly enhances process yield. This tool is also useful for automating in a large-scale manufacturing environment.

Referring to FIG. 2, in one embodiment, an encapsulation device 10, has a lid 12 and a housing 14. The housing 14 may be conceptualized as having a stationary portion 14B, and a slidable portion 14A slidably disposed in relation to the stationary portion. In other embodiments, the upper portion could be stationary and the lower portion slidably disposed to the stationary portion.

A vacuum chuck 16 is disposed on the lid 12 for receiving a portion of an organic electronic device, such as a sub-assembly, substrate, or lid. In one embodiment, the chuck 16 receives a substrate.

A vacuum chuck 18 is disposed on the housing 14 for receiving a portion of an organic electronic device, such as a sub-assembly, substrate, or lid. In one embodiment, the chuck 18 receives a lid.

The lid 12 and housing 14 can be brought together, defining a sealed space where the organic electronic device is retained as the portions of the organic electronic device are affixed together under controlled conditions. In one embodiment, the weight of the lid 12 and the tolerances between the chucks 16 and 18 are selected to apply the appropriate force to compress the portions of the organic electronic device together. It is desirable to prevent increases in pressure inside the organic electronic device when the portions are compressed, and thus the pressure in the sealed space is often below atmospheric pressure. Also, organic electronic devices are harmed by water vapor and certain gasses, and so a controlled gas environment during fabrication is extremely desirable.

A window 20 to allow UV light to pass, drop cylinders 22 to controllably bring the portions together, and fittings 24 for vacuum and venting, are also disposed on the housing 14.

Alignment micrometers 26 are disposed on the housing 14 for aligning the fiducials of the portions of the organic electronic device with the optical system 28. In one embodiment, the optical system 28 comprises cameras and optics for alignment.

A slide 30 is disposed for allowing the slidable portion 14A of the housing to move in relation to the stationary portion 14B of the housing.

A UV light 32 is disposed in the housing 14 for curing. Upon movement of the slidable portion 14A of the housing, the organic electronic device can be exposed to UV light to affix the portions of the organic electronic device together.

In operation, the device is adapted to receive at least one portion of a organic electronic device to be fabricated. In one embodiment, the organic electronic device is to receive an encapsulation lid. Thus, for example, the encapsulation lid can be retained in the housing or lid of the device and the remainder of the organic electronic device can be retained in the lid or housing of the device. The lid and housing can then be brought together, defining a sealed space where the organic electronic device is retained as the encapsulation lid is affixed to the remainder of the organic electronic device under controlled conditions. It is contemplated that the device's lid and/or housing can be customized to fit a particular encapsulation lid shape or organic electronic device shape. Alternatively the lid and housing can be of a sufficient size to retain a number of organic electronic devices (i.e., encapsulation lids in the device's lid or housing and the remainders of the organic electronic devices in the complementary portion of the device).

In another embodiment, a method for encapsulating an organic electronic device, comprising controlling the internal pressure of the organic electronic device after encapsulation is provided.

In yet another embodiment, provided is a method for aligning an encapsulation lid of an organic electronic device, comprising placing the organic electronic device in a device as described above.

Organic Electronic Device

Figure 1:
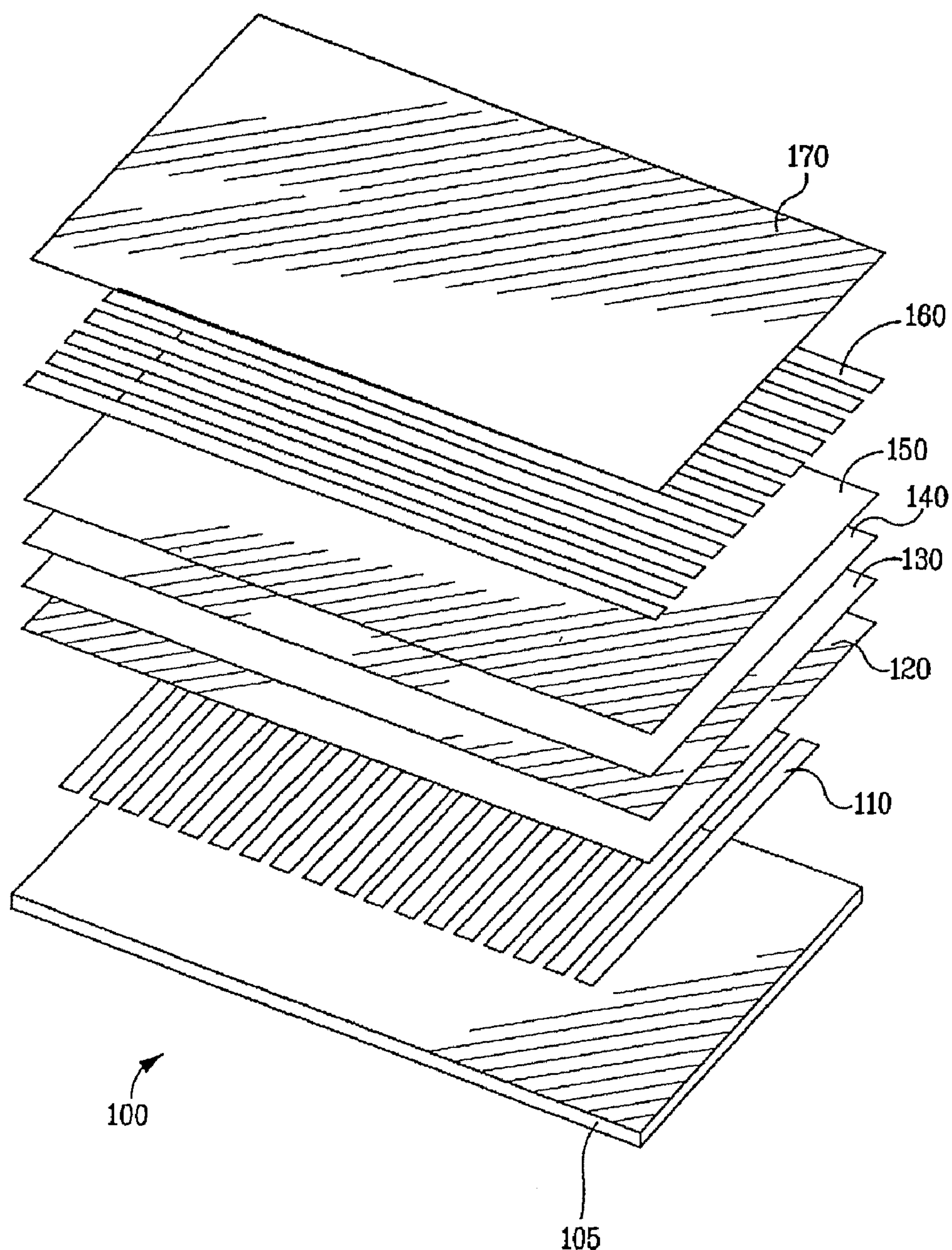
FIG. 1 is a schematic diagram of an organic electronic device.

Referring to FIG. 1, an exemplary organic electronic device 100 is shown. The device 100 includes a substrate 105. The substrate 105 may be rigid or flexible, for example, glass, ceramic, metal, or plastic. When voltage is applied, emitted light is visible through the substrate 105.

A first electrical contact layer 110 is deposited on the substrate 105. For illustrative purposes, the layer 110 is an anode layer. Anode layers may be deposited as lines. The anode can be made of, for example, materials containing or comprising metal, mixed metals, alloy, metal oxides or mixed-metal oxide. The anode may comprise a conducting polymer, polymer blend or polymer mixtures. Suitable metals include the Group 11 metals, the metals in Groups 4, 5, and 6, and the Group 8, 10 transition metals. If the anode is to be light-transmitting, mixed-metal oxides of Groups 12, 13 and 14 metals, such as indium-tin-oxide, are generally used. The anode may also comprise an organic material, especially a conducting polymer such as polyaniline, including exemplary materials as described in *Flexible Light-Emitting Diodes Made From Soluble Conducting Polymer, Nature* 1992, 357, 477-479. At least one of the anode and cathode should be at least partially transparent to allow the generated light to be observed.

An optional buffer layer 120, such as hole transport materials, may be deposited over the anode layer 110, the latter being sometimes referred to as the "hole-injecting contact layer." Examples of hole transport materials suitable for use as the layer 120 have been summarized, for example, in Kirk Othmer, Encyclopedia of Chemical Technology, Vol. 18, 837-860 ($4^{th}$ ed. 1996). Both hole transporting "small" molecules as well as oligomers and polymers may be used. Hole transporting molecules include, but are not limited to: N,N' diphenyl-N,N'-bis(3-methylphenyl)-[1,1'-biphenyl]-4,4'-diamine (TPD), 1,1 bis[(di-4-tolylamino)phenyl]cyclohexane (TAPC), N,N' bis(4-methylphenyl)-N,N'-bis(4-ethylphenyl)-[1,1'-(3,3'-dimethyl)biphenyl]-4,4'-diamine (ETPD), tetrakis (3-methylphenyl)-N,N,N',N'-2,5-phenylenediamine (PDA), a-phenyl 4-N,N-diphenylaminostyrene (TPS), p (diethylamino)benzaldehyde diphenylhydrazone (DEH), triphenylamine (TPA), bis[4 (N,N-diethylamino)-2-methylphenyl](4-methylphenyl)methane (MPMP), 1 phenyl-3-[p-(diethylamino) styryl]-5-[p-(diethylamino)phenyl] pyrazoline (PPR or DEASP), 1,2 trans-bis(9H-carbazol-9-yl)cyclobutane (DCZB), N,N,N',N' tetrakis(4-methylphenyl)-(1,1'-biphenyl)-4,4'-diamine (TTB), and porphyrinic compounds, such as copper phthalocyanine. Useful hole transporting polymers include, but are not limited to, polyvinylcarbazole, (phenylmethyl)polysilane, and polyaniline. Conducting polymers are useful as a class. It is also possible to obtain hole transporting polymers by doping hole transporting moieties, such as those mentioned above, into polymers such as polystyrenes and polycarbonates.

An organic layer 130 may be deposited over the buffer layer 120 when present, or over the first electrical contact layer 110. In some embodiments, the organic layer 130 may be a number of discrete layers comprising a variety of components. Depending upon the application of the device, the organic layer 130 can be a light-emitting layer that is activated by an applied voltage (such as in a light-emitting diode or light-emitting electrochemical cell), or a layer of material that responds to radiant energy and generates a signal with or without an applied bias voltage (such as in a photodetector).

Other layers in the device can be made of any materials which are known to be useful in such layers upon consideration of the function to be served by such layers.

Any organic electroluminescent ("EL") material can be used as a photoactive material (e.g., in layer 130). Such materials include, but are not limited to, fluorescent dyes, small molecule organic fluorescent compounds, fluorescent and phosphorescent metal complexes, conjugated polymers, and mixtures thereof. Examples of fluorescent dyes include, but are not limited to, pyrene, perylene, rubrene, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of Iridium with phenylpyridine, phenylquinoline, or phenylpyrimidine ligands as disclosed in Petrov et al., Published PCT Application WO 02/02714, and organometallic complexes described in, for example, published applications US 2001/0019782, EP 1191612, WO 02/15645, and EP 1191614; and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, and mixtures thereof.

In one embodiment, photoactive material can be an organometallic complex. In another embodiment, the photoactive material is a cyclometalated complex of iridium or platinum. Other useful photoactive materials may be employed as well. Complexes of iridium with phenylpyridine, phenylquinoline, or phenylpyrimidine ligands have been disclosed as electroluminescent compounds in Petrov et al., Published PCT Application WO 02/02714. Other organometallic complexes have been described in, for example, published applications US 2001/0019782, EP 1191612, WO 02/15645, and EP 1191614. Electroluminescent devices with an active layer of polyvinyl carbazole (PVK) doped with metallic complexes of iridium have been described by Burrows and Thompson in published PCT applications WO 00/70655 and WO 01/41512. Electroluminescent emissive layers comprising a charge carrying host material and a phosphorescent platinum complex have been described by Thompson et al., in U.S. Pat. No. 6,303,238, Bradley et al., in *Synth. Met.* 2001, 116 (1-3), 379-383, and Campbell et al., in Phys. Rev. B, Vol. 65 085210.

A second electrical contact layer 160 is deposited on the organic layer 130. For illustrative purposes, the layer 160 is a cathode layer.

Cathode layers may be deposited as lines or as a film. The cathode can be any metal or nonmetal having a lower work function than the anode. Exemplary materials for the cathode can include alkali metals, especially lithium, the Group 2 (alkaline earth) metals, the Group 12 metals, including the rare earth elements and lanthanides, and the actinides. Materials such as aluminum, indium, calcium, barium, samarium and magnesium, as well as combinations, can be used. Lithium-containing and other compounds, such as LiF and $Li_2O$, may also be deposited between an organic layer and the cathode layer to lower the operating voltage of the system.

An electron transport layer 140 or electron injection layer 150 is optionally disposed adjacent to the cathode, the cathode being sometimes referred to as the "electron-injecting contact layer."

An encapsulation layer 170 is deposited over the contact layer 160 to prevent entry of undesirable components, such as water and oxygen, into the device 100. Such components can have a deleterious effect on the organic layer 130. In one embodiment, the encapsulation layer 170 is a barrier layer or film.

Though not depicted, it is understood that the device 100 may comprise additional layers. For example, there can be a layer (not shown) between the anode 110 and hole transport layer 120 to facilitate positive charge transport and/or band-gap matching of the layers, or to function as a protective layer. Other layers that are known in the art or otherwise may be used. In addition, any of the above-described layers may comprise two or more sub-layers or may form a laminar structure. Alternatively, some or all of anode layer 110 the hole transport layer 120, the electron transport layers 140 and 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; hole transport layer 120, 50-2000 Å, in one embodiment 200-1000 Å; photoactive layer 130, 10-2000 Å, in one embodiment 100-1000 Å; layers 140 and 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Devices can be prepared employing a variety of techniques. These include, by way of non-limiting exemplification, vapor deposition techniques and liquid deposition. Devices may also be sub-assembled into separate articles of manufacture that can then be combined to form the device.

DEFINITIONS

The use of "a" or "an" are employed to describe elements and components of the invention. This is done merely for convenience and to give a general sense of the invention. This description should be read to include one or at least one and the singular also includes the plural unless it is obvious that it is meant otherwise.

The term "active" when referring to a layer or material is intended to mean a layer or material that exhibits electronic or electro-radiative properties. An active layer material may emit radiation or exhibit a change in concentration of electron-hole pairs when receiving radiation. Thus, the term "active material" refers to a material which electronically facilitates the operation of the device. Examples of active materials include, but are not limited to, materials which conduct, inject, transport, or block a charge, where the charge can be either an electron or a hole. Examples of inactive materials include, but are not limited to, planarization materials, insulating materials, and environmental barrier materials.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "layer" is used interchangeably with the term "film" and refers to a coating covering a desired area. The area can be as large as an entire device or a specific functional area such as the actual visual display, or as small as a single sub-pixel. Films can be formed by any conventional deposition technique, including vapor deposition and liquid deposition. Liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode). The term device also includes coating materials for memory storage devices, antistatic films, biosensors, electrochromic devices, solid electrolyte capacitors, energy storage devices such as a rechargeable battery, and electromagnetic shielding applications.

The term substrate is intended to mean a workpiece that can be either rigid or flexible and may include one or more layers of one or more materials, which can include, but are not limited to, glass, polymer, metal, or ceramic materials, or combinations thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Many aspects and embodiments have been described above and are merely exemplary and not limiting. After reading this specification, skilled artisans appreciate that other aspects and embodiments are possible without departing from the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The invention claimed is:

1. A device comprising:

a housing, wherein said housing comprises a stationary portion and a slidable portion slidably disposed in relation to the stationary portion;

a lid for engaging the housing, such that when engaged, the lid and housing define a sealed space therebetween;

an optical system for aligning fiducials of portions of an organic electronic device;

at least one UV light source disposed in the housing, wherein upon movement of the slidable portion of the housing the organic electronic device can be exposed to UV light for curing; and a controller for modifying conditions in the sealed space;

wherein the housing or lid or both comprise a vacuum chuck for receiving a portion of an organic electronic device.

2. The device of claim 1, wherein the sealed space is adapted for receiving an organic electronic device.

3. The device of claim 1, wherein the controller controls pressure in the sealed space.

4. The device of claim 1, wherein the controller controls temperature in the sealed space.

5. The device of claim 1, wherein the controller controls the gas identity in the sealed space.

6. The device of claim 1 comprising at least one alignment camera.

7. A method for aligning an encapsulation lid of an organic electronic device, comprising:

placing the organic electronic device in a device of claim 6.

8. The device of claim 1 wherein the lid comprises the vacuum chuck.

9. The device of claim 1 wherein the housing comprises the vacuum chuck.

* * * * *